United States Patent
Wier

(10) Patent No.: US 6,712,306 B2
(45) Date of Patent: Mar. 30, 2004

(54) COUPLING DISC FOR A BELT RETRACTOR OF A VEHICLE SAFETY BELT

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/424,037

(22) Filed: Apr. 25, 2003

(65) Prior Publication Data

US 2003/0205638 A1 Nov. 6, 2003

(30) Foreign Application Priority Data

May 2, 2002 (DE) .................... 202 06 978 U

(51) Int. Cl.⁷ .................................... B60R 22/405
(52) U.S. Cl. ........................................ 242/383.4
(58) Field of Search ..................... 242/383.4, 383.5, 242/383.2, 383.1, 383, 384–384.6; 297/478; 280/806

(56) References Cited

U.S. PATENT DOCUMENTS 6,152,393 A * 11/2000 Ando et al. ............... 242/383.5

FOREIGN PATENT DOCUMENTS

| DE | 3448098 C2 | 2/1986 |
| DE | 3919218 C2 | 12/1990 |
| DE | 3920140 A1 | 1/1991 |
| DE | 4423958 A1 | 1/1996 |
| DE | 19752338 A1 | 6/1999 |
| DE | 20109534 U1 | 11/2001 |

* cited by examiner

Primary Examiner—John M. Jillions
(74) Attorney, Agent, or Firm—Tarolli, Sundheim, Covell & Tummino L.L.P.

(57) ABSTRACT

A coupling disc for a belt retractor of a vehicle safety belt comprises a coupling catch which is pivotally mounted on the coupling disc so as to be movable between a position of rest and a coupling position. The coupling catch and the coupling disc are formed in one piece from plastic.

14 Claims, 4 Drawing Sheets

COUPLING DISC FOR A BELT RETRACTOR OF A VEHICLE SAFETY BELT

TECHNICAL FIELD

The invention relates to a coupling disc for a belt retractor of a vehicle safety belt.

BACKGROUND OF THE INVENTION

A coupling disc normally has a coupling catch which is pivotally mounted thereon so as to be movable between a position of rest and a coupling position.

The coupling disc is a generally known component of a locking mechanism by which a belt spool of the belt retractor can be locked so that no more safety belt can be withdrawn from the belt retractor. For the sake of completeness, such a locking mechanism is briefly described below with reference to FIG. 1.

The belt retractor has a frame 10, in which a belt spool 12 is rotatably mounted. The belt spool 12 is provided on at least one axial end with locking teeth 14 into which a locking catch 16 can be guided. The locking catch is pivotally mounted on the frame 10. To move the locking catch, an actuating pin 18 is used, which engages into a recess 20 of the locking catch 16 and is securely arranged on a locking lever 22. The locking lever 22 is pivotally arranged on the frame 10 turning about the same central axis C as the belt spool 12. The locking lever 22 is biased by a restoring spring 24 into the position of rest shown in FIG. 1, in which the actuating pin 18 holds the locking catch 16 in its position of rest, in which it does not engage into the teeth 14 of the belt spool 12. If, on the other hand, the locking lever 22 is rotated in the direction of the arrow A, i.e. clockwise with respect to FIG. 1, it guides the locking catch 16 into the locking teeth 14 of the belt spool 12 by means of the actuating pin 18. The belt spool is then locked against a further rotation in the direction of the arrow A, i.e. in the belt band withdrawal direction.

The rotation of the locking lever 22 for the purpose of locking the belt spool is brought about by a rotation of the belt spool 12 in the belt band withdrawal direction, this rotation being firstly transferred to a coupling disc 26 which is connected with the belt spool 12 for joint rotation therewith, and from this disc to the locking lever.

When the locking mechanism of the belt retractor is activated in a belt band-sensitive manner, i.e. when the angular acceleration of the belt spool 12, brought about by the belt band, exceeds a predetermined value, then a coupling catch 28 pivotally mounted on the coupling disc 26 is rotated out from its position of rest into a coupling position, in which it engages into coupling teeth 29 on the locking lever 22. A conventional inertia disc (not illustrated in FIG. 1) may be used for pivoting the coupling catch 28. When the coupling catch 28 is in its coupling position, a rotation of the belt spool is transferred via the coupling disc 26, connected to the spool for joint rotation therewith, the coupling catch 28 arranged on the coupling disc, and via the coupling teeth 29 to the locking lever 22 which is entrained in the direction of the arrow A. In this way, the actuating pin 18 arranged on the locking lever 22 can guide the locking catch 16 into the locking teeth 14 of the belt spool 12.

When the locking mechanism is triggered in a vehicle-sensitive manner, i.e. by exceeding an acceleration or deceleration acting on the vehicle and hence also on the belt retractor, a conventional inertia sensor (not illustrated) swivels an entrainment lever 30 from the position of rest shown in FIG. 1 into an active position in which it engages into entrainment teeth 32 provided on the coupling disc 26. The entrainment lever 30 is mounted on the locking lever 22 so that a rotation of the belt spool in the belt band withdrawal direction is transferred via the coupling disc 26, the entrainment teeth 32 and the entrainment lever 30 to the locking lever 22, whereby the locking catch 16 is guided by the actuating pin 18 into the locking teeth 14 of the belt spool 12.

With the belt band-sensitive engaging of the locking mechanism, it is important that the values of the angular acceleration are reproducible, at which the locking mechanism responds. For safety reasons, specific values must not be fallen below. If, however, the locking mechanism responds unnecessarily early, this can lead to the locking mechanism already responding when the safety belt is put on normally, but somewhat jerkily. This is generally felt to be unpleasant.

The object of the invention consists in providing a coupling disc by which as precise a response of the locking mechanism as possible is ensured.

BRIEF SUMMARY OF THE INVENTION

According to the invention, a coupling disc for a belt retractor of a vehicle safety belt comprises a coupling catch which is pivotally mounted on the coupling disc so as to be movable between a position of rest and a coupling position. The coupling catch and the coupling disc are formed in one piece from plastic. A hinge section is provided between the coupling catch and the coupling disc. The invention is based on the knowledge that the engaging parameters of the locking mechanism are most able to be reproduced if the friction which acts between the parts then moving on engaging of the locking mechanism is avoided as far as possible. In contrast to the prior art, in which usually the coupling catch is mounted on a pin on the coupling disc, according to the invention a type of film hinge or a spring is provided. Apart from a negligible internal material friction, which takes place with a bending of the hinge section, the coupling catch is arranged so as to be free of friction on the coupling disc. The inherent elasticity of the hinge section, furthermore, has the advantage that a restoring spring for the coupling catch may possibly be dispensed with; a restoring spring also produces friction in the system. Furthermore, advantages are produced as regards the installation and the production costs. The coupling catch does not need to be produced, provided and installed as a separate component, but rather is automatically produced on manufacture of the coupling disc as a part connected in one piece therewith. In this way, in addition, any risk of faulty installation is eliminated. A further advantage consists in that with the manufacture in one piece, the otherwise unavoidable tolerance fluctuations are eliminated. The hinge section may be adapted in a simple manner to the respective requirements by its cross-section being suitably selected. With a correspondingly small cross-section, the coupling catch can have such an easy action that no additional inertia disc is necessary for its actuation; it is rotated into its coupling position solely by the inertia- and centrifugal forces which act on it with a corresponding angular acceleration of the coupling disc.

According to a preferred embodiment of the invention, provision is made that the hinge section runs in a curved shape and has a rectangular cross-section, the longer direction of which runs parallel to the swivel axis of the coupling catch. In this way, a slight bending resistance is produced for the swiveling of the coupling catch between the position of rest and the coupling position, however a very much higher bending resistance against an "undesired" deflection of the coupling catch transversely thereto.

Preferably, provision is made that the coupling disc has a support surface on which the coupling catch can rest when it is in the coupling position. As the hinge section can only transfer very small forces owing to its flexibility, the use of a support surface presents itself, in order to introduce the forces necessary for swiveling the locking lever on a short distance from the coupling disc via the coupling catch into the coupling teeth of the locking lever.

If no additional inertia disc is to be used for swiveling the coupling catch, provision is preferably made that on the coupling catch a weight element of metal is provided, for example a ball which is clipped into the coupling catch. In this way, the inertia- and centrifugal forces can be increased which in the case of an angular acceleration of the coupling disc act on the coupling catch and swivel the latter from the position of rest into the coupling position.

Alternatively, provision can be made that the coupling disc is provided with an inertia disc which has an actuation extension which can move the coupling catch into the coupling position. Also in this case, positive use is made of the small friction forces for the mounting of the coupling catch.

Preferably, provision is made that the inertia disc is provided with at least one stop extension and the coupling disc has at least one elastic damping element on which the stop extension can rest. The necessary delimitation of rotation of the inertia disc relative to the coupling disc is delimited by the stop extension together with the damping element, the elasticity of the damping element serving to entrain the stop extension of the inertia disc as gently as possible when the damping element of the leading coupling disc meets the stop extension of the still stationary inertia disc.

The coupling disc is preferably provided with at least one reinforcement rib. Such a reinforcement rib serves to prevent a possible distortion of the coupling disc. As the mounting of the coupling catch by means of the hinge section is very compact, a large number of reinforcement ribs can be provided on the coupling disc.

For an instance where the inherent elasticity of the hinge section is not sufficient to reliably restore the coupling catch to its position of rest, a restoring spring of metal is provided. This preferably consists of a spring wire having a round cross-section, because the spring characteristics of a spring wire with a round cross-section are subject to lower tolerances than those of a spring wire having a rectangular cross-section. The spring wire is preferably clipped simply into a groove on the coupling disc and lies against a holding nose of the coupling catch.

Two coupling catches may also be provided, which lie diametrically opposite each other. This is particularly advantageous when no restoring spring is used for the coupling catch, but rather merely the inherent elasticity of the correspondingly thinly dimensioned hinge section is used. In this case, the restoring force of the hinge section is expectedly so small that the influence of gravity on the coupling catch takes effect on the engaging behavior. Therefore the coupling catch, which with an installed belt retractor, according to rotation of the coupling disc, is in fact situated in the lower region of its path, i.e. in the "6 o'clock position", will be guided undesirably early into the coupling teeth of the locking lever, because this is supported by gravity. This can be counteracted by a stop being provided, fixed to the frame, on the belt retractor, which stop extends across a defined angular section along the lower region of the path of movement of the coupling catches. This stop prevents the one coupling catch which is then situated in the lower region of its path, from being rotated out of its position of rest into the coupling position and thereby already with an undesirably low angular acceleration of the belt spool leading to its locking. If the constructionally provided angular acceleration of the belt spool is reached, which is to lead to a locking, the opposite coupling catch, namely the one situated in the region of the "12 o'clock position" is available for activation of the locking mechanism. If, on the other hand, the coupling disc is in a position in which the two coupling catches lying opposite each other are in the "3 o'clock position" and the "9 o'clock position", both coupling catches are available.

According to one preferred embodiment provision is made that the hinge section is formed by a leaf spring which is embedded in the coupling disc and the coupling catch by injection-molding, so that the coupling catch is made in one piece with the coupling disc.

Advantageous developments of the invention will become apparent from the sub-claims.

DETAILED DESCRIPTION OF THE PREFERRED EMBODIMENTS

Figure 1:
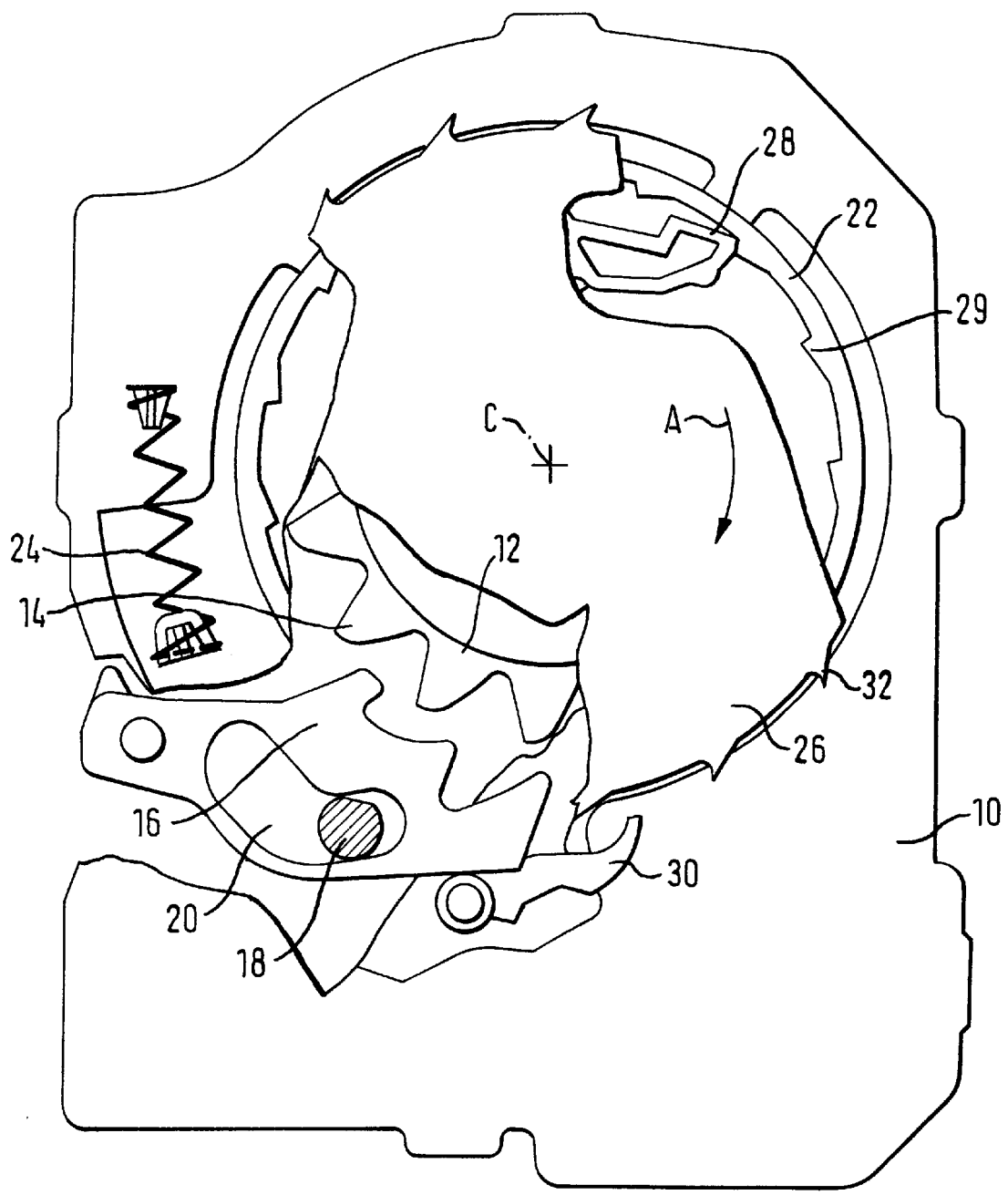
FIG. 1 shows in a diagrammatic side view with cut-outs a belt retractor in which the coupling disc according to the invention can be used.
Figure 2:
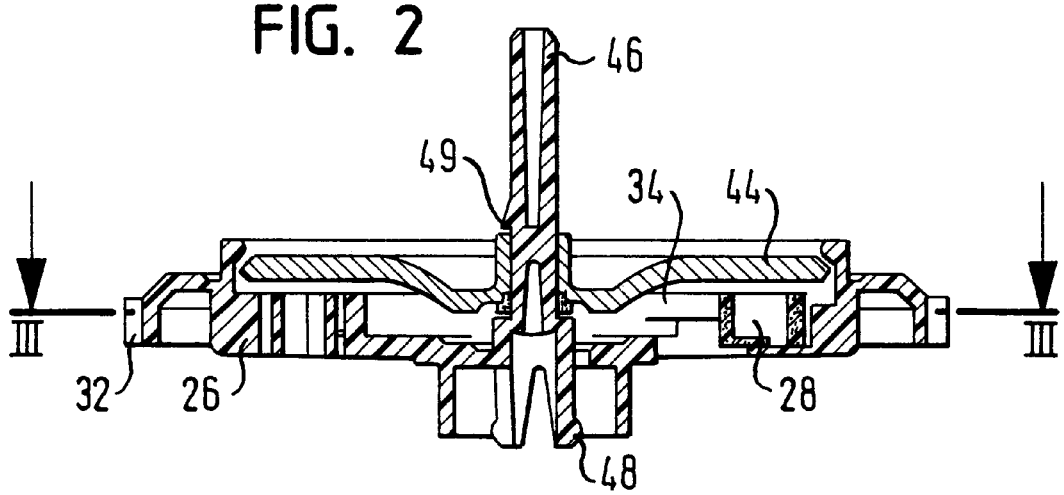
FIG. 2 shows in a section along the plane II—II of FIG. 3 a coupling disc provided with an inertia disc, according to a first embodiment of the invention.
Figure 3:
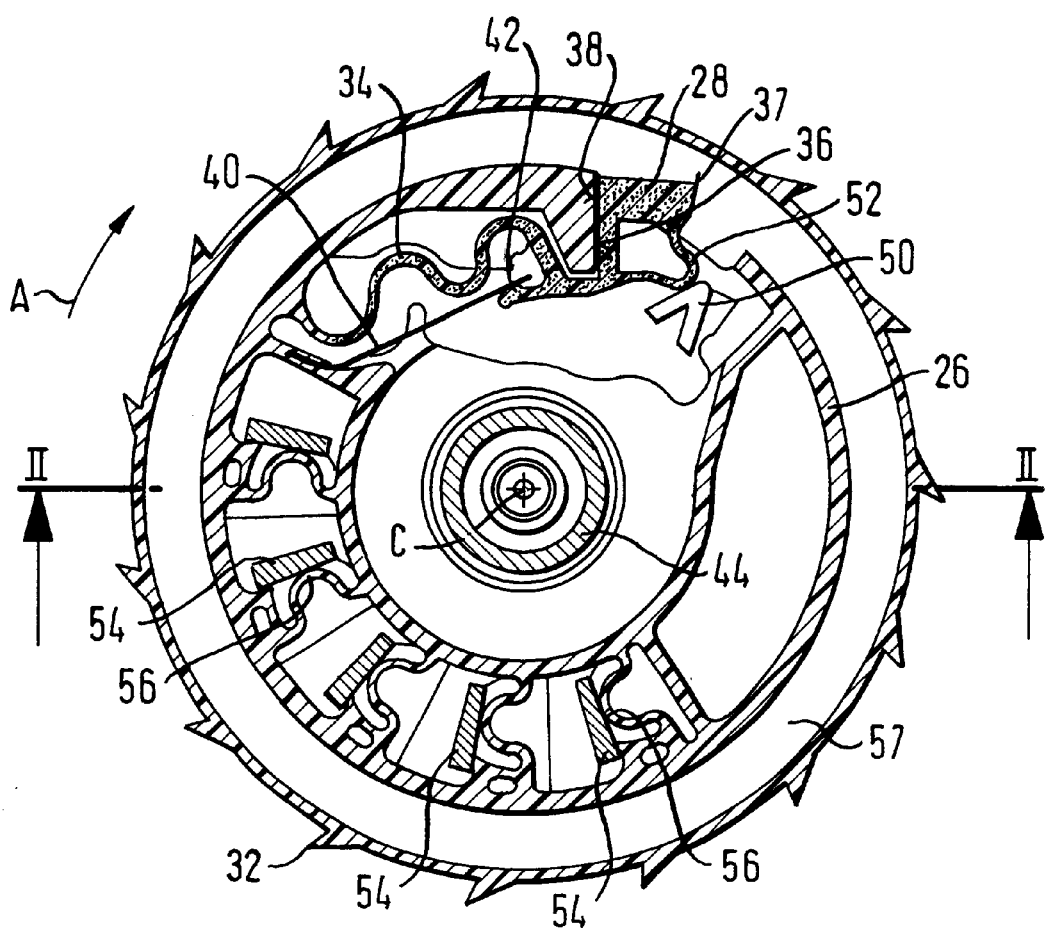
FIG. 3 shows a section along the plane III—III of FIG. 2.

The coupling disc 26 shown in FIGS. 2 and 3 has, in the same manner as the coupling disc known from FIG. 1, a coupling catch 28. This is shown in FIG. 3 in its coupling position. An essential feature of the coupling disc shown in FIGS. 2 and 3 consists in that the coupling catch 28 is constructed in one piece with the coupling disc. As a connection between the coupling disc 26 and the coupling catch 28, a hinge section 34 is provided, which has a thin, rectangular cross-section and in the embodiment shown runs, curved several times, between the coupling disc and the coupling catch. As can be seen in FIG. 3, the cross-section of the hinge section is smallest in the region of the first bend, when the path is observed starting from the coupling disc. In the subsequent bends, the cross-section is smaller. In this way, the region is given in which the bending of the hinge section principally occurs. The hinge section acts here in the manner of a film hinge. Provision may be made that the hinge section has a second plastic component which is also injected during injection of the material. In this way, the strength characteristics of the hinge section can be set within further limits, by two plastic materials having different characteristics being suitably combined with each other.

The coupling disc 26 is provided with a support surface 36 on which the rear face 38, facing away from the tip 37 of the coupling catch 28, can rest when the coupling catch 28 is in its coupling position. In this way, the forces which are introduced from the tip 37 of the coupling catch into the latter are directly transferred into the coupling disc 26, without the hinge section 34 being stressed.

To restore the coupling catch 28 into its position of rest, namely radially inwards with respect to FIG. 3, a restoring spring 40 is provided which is a spring wire having a round cross-section. This is clipped into a groove in the coupling disc and rests on a holding nose 42 on the coupling catch 28.

To actuate the coupling catch 28, an inertia disc 44 is provided, which is rotatably mounted on a bearing pin 46 with as little friction as possible. In order to achieve a high moment of inertia, the inertia disc consists of metal. The bearing pin 46 is constructed in one piece with the coupling disc 26 and is connected with the belt spool 12 of the belt retractor for joint rotation therewith. For this purpose, detent tongues 48 are provided here. As can be seen in FIG. 2, the inertia disc 44 is held in a space-saving manner inside the coupling disc 28; for axial fixing, a detent nose 48 is provided on the bearing pin 46. The bearing pin has a diameter of a maximum of 6 mm, so that a small friction diameter is produced.

The inertia disc 44 is provided with an actuating extension 50, which may rest on an actuating tongue 52 of the coupling catch 28. The actuating tongue 52 is constructed here so as to be very thin and, in addition, curved, so that it is slightly elastic. The inertia disc 44 is, in addition, provided with several stop extensions 54, which can cooperate with elastic damping elements 56 which are constructed as cross-pieces constructed in one piece with the coupling disc 26.

As the coupling catch 28 is mounted so as to be almost free of friction, a readily reproducible engaging behavior of the coupling catch is produced. The friction acting on the inertia disc can be reduced in that the diameter of the bearing pin 46 is selected so as to be as small as possible. A small friction radius then results. The influence of any manufacturing tolerances with regard to the inertia disc can be reduced in that as much weight as possible is concentrated in as great a distance as possible from its rotation axis.

In the position of rest of the system, the coupling catch 28 is in its position of rest, in which its tip does not project into the channel 57, in which the coupling teeth 29 of the locking lever 22 are arranged.

If, starting from this state of rest, the belt spool is accelerated in the belt band unwinding direction, the coupling disc 26 is also immediately entrained. As the inertia disc 44 is mounted with low friction on the bearing pin 46 and has a high moment of inertia, it lags behind the rotation of the coupling disc 26. Thereby, the coupling catch 28 rides up the actuating extension 50 of the inertia disc, and the coupling catch 28 is moved into its coupling position shown in FIG. 3. Towards the end of this relative rotation, which is necessary for engaging the coupling catch 28 into the coupling teeth, the stop extensions 54 of the inertia disc are entrained by means of the elastic damping elements 56 of the coupling disc.

Figure 4:
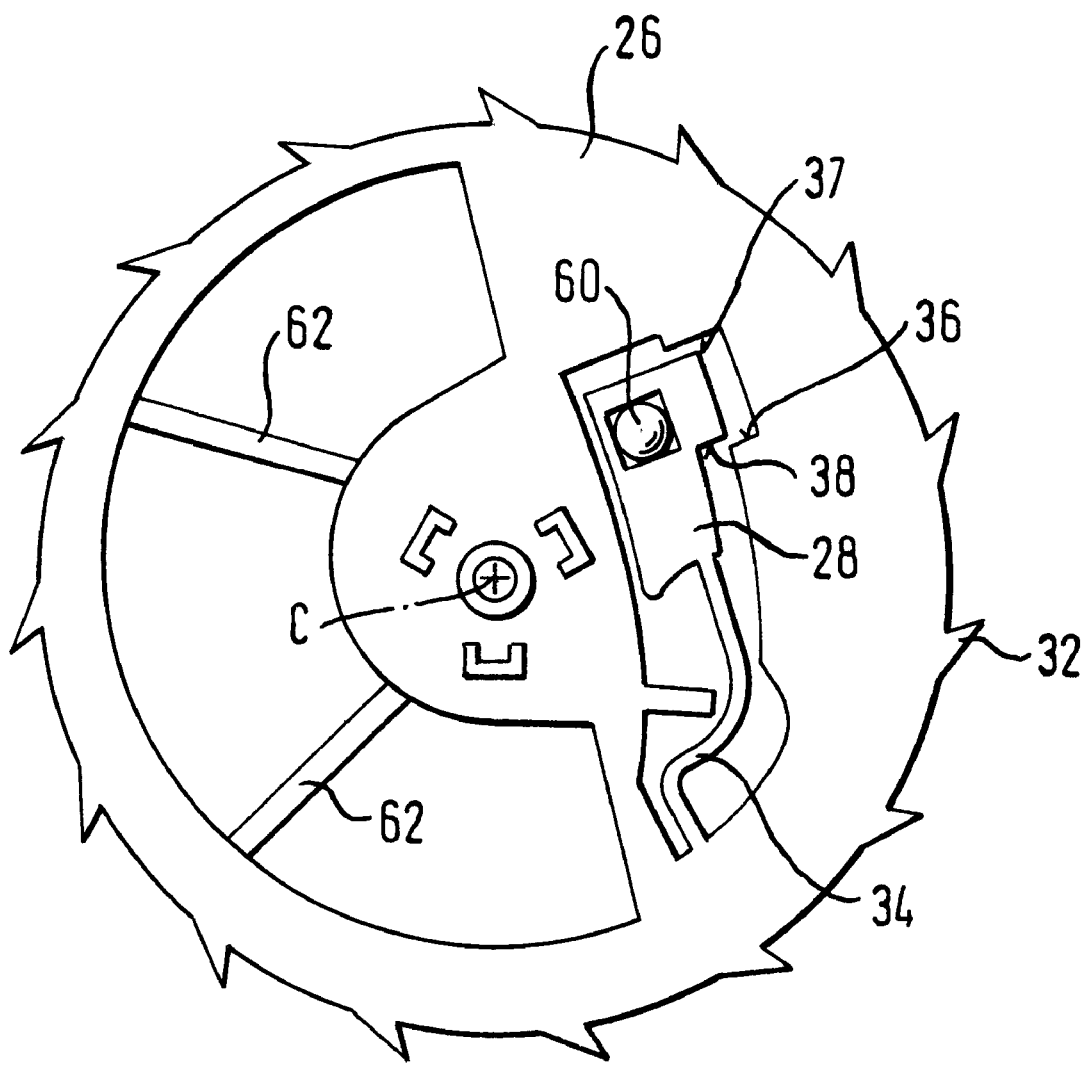
FIG. 4 shows in a diagrammatic top view a coupling disc according to a second embodiment of the invention.

In FIG. 4 a coupling disc is shown in accordance with a second embodiment, the coupling catch 28 being situated in its position of rest. The same reference numbers are used for the elements known from the first embodiment, and in this respect reference is to be made to the above explanations.

The most essential difference between the first and the second embodiment consists in that in the second embodiment, no inertia disc is provided for engaging the coupling catch 28. The coupling catch is mounted with such a low resistance and with such a low inherent elasticity of the hinge section 34 that it is rotated from its position of rest into the coupling position solely by the inertia- and centrifugal forces, which act in the case of a rotation of the coupling disc. So that the coupling catch 28 has the mass necessary for this, it is provided with a weight element 60, which is constructed here as a metal ball which is clipped into a mounting of the coupling catch 28. A further difference from the first embodiment consists in that the hinge section 34 no longer runs in an undulating form, but rather is only slightly curved. A further difference consists finally in that the coupling disc 28 is provided with several reinforcement ribs 62, which prevent the coupling disc 26 from distorting.

Figure 5:
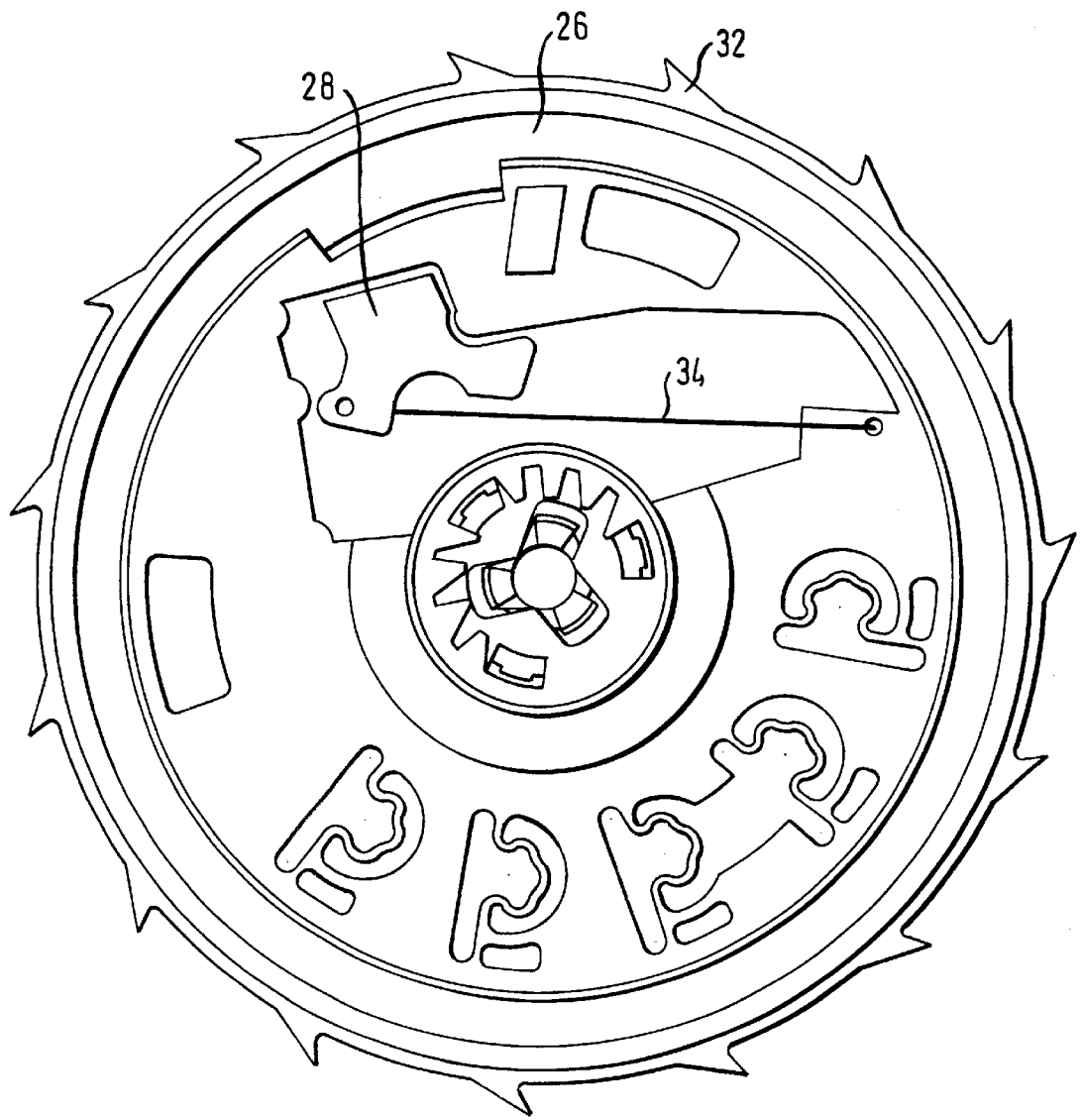
FIG. 5 shows in a schematic top view a coupling disc according to a third embodiment of the invention.

In FIG. 5 there is shown a coupling disc according to a third embodiment of the invention. The most essential difference to the preceding embodiments is that a leaf spring 34 is used as hinge section. The leaf spring is placed in the injection mold for the coupling disc, so that it is embedded in the material of the coupling disc and the coupling catch during injection-molding. In this way the coupling catch is connected in one piece with the coupling disc without the need of separate mounting steps. In addition, it is not necessary to use a separate return spring.

What is claimed is:

1. A coupling disc for a belt retractor of a vehicle safety belt, said coupling disc comprising a coupling catch which is pivotally mounted on said coupling disc so as to be movable between a position of rest and a coupling position, said coupling catch and said coupling disc being formed in one piece from plastic.

2. The coupling disc according to claim 1, wherein a hinge section is formed between said coupling catch and said coupling disc.

3. The coupling disc according to claim 2, wherein said hinge section has a rectangular cross-section, a longer direction of which runs parallel to a swivel axis of said coupling catch.

4. The coupling disc according to claim 3, wherein said hinge section runs in a curved shape.

5. The coupling disc according to claim 4, wherein said hinge section has more than one curvature, in particular three curvatures, having main directions that alternate.

6. The coupling disc according to claim 1, wherein it has a support surface on which said coupling catch can rest when it is in said coupling position.

7. The coupling disc according to claim 1, wherein provided on said coupling catch is a weight element which has a density greater than 5000 $kg/m^3$ and in particular is made of metal.

8. The coupling disc according to claim 7, wherein said weight element is a ball which is clipped in.

9. The coupling disc according to claim 1, wherein it is provided with an inertia disc which has an actuating extension, the latter being able to move said coupling catch into said coupling position.

10. The coupling disc according to claim 9, wherein said inertia disc is provided with at least one stop extension, and said coupling disc has at least one elastic damping element on which said stop extension can rest.

11. The coupling disc according to claim 1, wherein it is provided with at least one reinforcement rib.

12. The coupling disc according to claim 1, wherein a restoring spring is provided which biases said coupling catch into said position of rest.

13. The coupling disc according to claim 1, wherein two coupling catches are provided which lie diametrically opposite each other.

14. The coupling disc according to claim 2, wherein said hinge section is formed by a leaf spring which is embedded in said coupling disc and said coupling catch by injection-molding, so that said coupling catch is made in one piece with said coupling disc.

* * * * *